US008719419B2

(12) United States Patent
Usmani et al.

(10) Patent No.: US 8,719,419 B2
(45) Date of Patent: May 6, 2014

(54) METHODS AND APPARATUS FOR DETERMINING ASPECTS OF MULTIMEDIA PERFORMANCE OF A WIRELESS DEVICE

(75) Inventors: Farrukh Usmani, Carlsbad, CA (US); Kenny Fok, San Diego, CA (US); Tia Manning Cassett, San Diego, CA (US); Eric Chi Chung Yip, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1712 days.

(21) Appl. No.: 11/405,945

(22) Filed: Apr. 17, 2006

(65) Prior Publication Data

US 2006/0259629 A1  Nov. 16, 2006

Related U.S. Application Data

(60) Provisional application No. 60/674,108, filed on Apr. 21, 2005.

(51) Int. Cl.
*G06F 15/16* (2006.01)

(52) U.S. Cl.
USPC ........... 709/227; 709/226; 709/225; 709/229; 714/25; 714/45

(58) Field of Classification Search
USPC .......... 709/227, 228, 229, 223, 224; 345/173; 714/37
See application file for complete search history.

(56) References Cited

U.S. PATENT DOCUMENTS

| | | | |
|---|---|---|---|
| 5,495,571 A * | 2/1996 | Corrie et al. | 714/38.1 |
| 5,701,408 A * | 12/1997 | Cornell et al. | 714/38.1 |
| 5,774,725 A * | 6/1998 | Yadav et al. | 717/135 |
| 5,943,617 A | 8/1999 | Nakamura | |
| 5,954,829 A * | 9/1999 | McLain et al. | 714/712 |
| 6,279,124 B1 * | 8/2001 | Brouwer et al. | 714/38 |
| 6,389,278 B1 * | 5/2002 | Singh | 455/414.3 |
| 6,397,359 B1 * | 5/2002 | Chandra et al. | 714/712 |
| 6,473,794 B1 | 10/2002 | Guheen et al. | |

(Continued)

FOREIGN PATENT DOCUMENTS

| | | |
|---|---|---|
| EP | 1441491 A1 | 7/2004 |
| JP | 07203028 | 8/1995 |

(Continued)

OTHER PUBLICATIONS http://ceit.aut.ac.ir/~bakhshis/ns-2/An%20Introduction%20to%20NS,%20Nam%20and%20OTcl%20scripting.pdf "An Introduction to NS, Nam, and OTCL scripting"—Meeneghan et al, University of Ireland, Maynooth, Apr. 2004.*

(Continued)

*Primary Examiner* — Randy Scott
(74) *Attorney, Agent, or Firm* — James T. Hagler (57) ABSTRACT

Apparatus and methods may include a multimedia test engine operable to exercise and test multimedia application programming interfaces (APIs) of a wireless device based upon execution of a test configuration comprising a test script downloadable to the wireless device. The test engine is resident in memory on the wireless device and is operable to collect multimedia test data and, in some aspects, wireless device performance data, based upon the test configuration and forward the collected data to another device operable to analyze the collected data and generate a multimedia API test report viewable by an authorized user.

24 Claims, 7 Drawing Sheets

(56) References Cited

U.S. PATENT DOCUMENTS

| | | |
|---|---|---|
| 6,788,934 B2 * | 9/2004 | Keenan et al. ............... 455/424 |
| 6,862,682 B2 | 3/2005 | Louden et al. |
| 6,901,442 B1 * | 5/2005 | Schwaller et al. ............ 709/224 |
| 6,965,769 B2 * | 11/2005 | Bims et al. .................... 455/423 |
| 7,321,766 B2 * | 1/2008 | Liu et al. ....................... 455/425 |
| 7,415,635 B1 * | 8/2008 | Annangi ........................ 714/38 |
| 2002/0156937 A1 | 10/2002 | Wong et al. |
| 2004/0162898 A1 * | 8/2004 | Rich .............................. 709/224 |
| 2004/0254757 A1 * | 12/2004 | Vitale et al. ................... 702/122 |
| 2005/0005198 A1 * | 1/2005 | Vakrat et al. .................. 714/37 |
| 2005/0059354 A1 * | 3/2005 | Zhao et al. .................... 455/67.11 |
| 2005/0129183 A1 * | 6/2005 | Booth ............................ 379/1.01 |
| 2005/0144530 A1 * | 6/2005 | Louden et al. ................. 714/38 |
| 2006/0229018 A1 * | 10/2006 | Mlinarsky et al. ............ 455/67.11 |

FOREIGN PATENT DOCUMENTS

| | | |
|---|---|---|
| JP | H1028088 A | 1/1998 |
| JP | 2001285481 A | 10/2001 |
| JP | 2003124866 | 4/2003 |
| JP | 2006060762 A | 3/2006 |
| WO | WO9638733 A1 | 12/1996 |

OTHER PUBLICATIONS

International Search Report and Written Opinion—PCT/US2006/015137, International Searching Authority—European Patent Office, Feb. 16, 2007.

* cited by examiner

METHODS AND APPARATUS FOR DETERMINING ASPECTS OF MULTIMEDIA PERFORMANCE OF A WIRELESS DEVICE

CLAIM OF PRIORITY UNDER 35 U.S.C. §119

The present Application for Patent claims priority to Provisional Application No. 60/674,108 entitled "Methods And Apparatus For Providing Multimedia Test Engines For A Wireless Device," filed Apr. 21, 2005, assigned to the assignee hereof and hereby expressly incorporated by reference herein.

BACKGROUND

The described embodiments generally relate to wireless communication devices and software testing. More particularly, the described embodiments relate to a framework for testing multimedia application programming interfaces (APIs) on a wireless device.

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network.

Wireless devices are being manufactured with increased computing capabilities and are becoming tantamount to personal computers. These "smart" wireless devices, such as cellular telephones, have APIs installed onto their local computer platform that allow software developers to create software applications that operate on the cellular telephone. The API sits between the wireless device system software and the software application, making the cellular telephone functionality available to the application without requiring the software developer to have the specific cellular telephone system source code.

Multimedia features that receive, display, and transmit video, audio, and clips are some of the latest innovations now being offered on wireless devices and require longer and more complex testing prior to release. Because a new multimedia application may require a new API, a carrier and/or original equipment manufacturer (OEM) must test not only the new application program, but must also test all new multimedia APIs. Furthermore, testing of the main application may not be possible, without prior testing of any underlying APIs.

Accordingly, it would be advantageous to provide apparatus and methods providing a test framework wherein multimedia APIs are tested and exercised independent of the multimedia applications relying upon them.

SUMMARY

The described embodiments comprise apparatus, methods, computer readable media and processors operable to provide a systematic and automatic way to exercise and test multimedia application programming interfaces (APIs). Such embodiments may reduce regression testing of a wireless device chipset provider/OEM. Furthermore, application test time may be reduced by testing the underlying APIs independent of the application.

In some aspects, a method of testing multimedia application programming interfaces (APIs) on a wireless device on a wireless network comprises obtaining on the wireless device a multimedia test configuration including at least one test script. The method further includes executing the at least one test script on the wireless device, the at least one test script operable to exercise a predetermined multimedia application program interface (API) embodied on the wireless device. Further, the method includes recording on the wireless device multimedia test data relating to performance of the multimedia API based on execution of the test script. Additionally, the method includes forwarding the recorded multimedia test data for analysis of the performance of the multimedia API. In related aspects, a machine-readable medium comprises instructions which, when executed by a machine, cause the machine to perform the above-stated operations. In other related aspects, at least one processor is configured to perform the above-stated actions.

In other aspects, a wireless device comprises means for obtaining on the wireless device a multimedia test configuration including at least one test script. The wireless device also includes means for executing the at least one test script on the wireless device, where the at least one test script operable to exercise a predetermined multimedia application program interface (API) embodied on the wireless device. Further, the wireless device includes means for recording on the wireless device multimedia test data relating to performance of the multimedia API based on execution of the test script. Additionally, the wireless device includes means for forwarding the recorded multimedia test data for analysis of the performance of the multimedia API.

In still other aspects, a wireless device comprises a processing engine and an application programming interface (API) operable to provide an interface to the processing engine. The wireless device further includes a memory comprising a multimedia test engine executable by the processing engine. The multimedia test engine comprises a test configuration having a test script operable to call and test the performance of the API. Further, the multimedia test engine comprises monitoring logic and reporting logic. The monitoring logic is operable to monitor and record multimedia test data associated with the operation of the API and the execution of the test script. The reporting logic is operable to forward the recorded multimedia test data to a predetermined device across a wireless network.

In further aspects, a method of determining a performance of a multimedia application programming interface (API) on a wireless device on a wireless network comprises generating a test configuration comprising a test script operable to test the performance of a predetermined multimedia API. The method further includes forwarding the test configuration across the wireless network to the wireless device. Also, the method includes receiving multimedia test data and wireless device performance data from the wireless device across the wireless network based on execution of the test configuration, and analyzing the received multimedia data and wireless device performance data. Additionally, the method includes generating a test report based on the analysis. In related aspects, a machine-readable medium comprises instructions which, when executed by a machine, cause the machine to perform the above-stated operations. In other related aspects, at least one processor is configured to perform the above-stated actions.

In still other aspects, an apparatus comprises means for generating a test configuration comprising a test script operable to test the performance of a predetermined multimedia API. The apparatus also includes means for forwarding the test configuration across the wireless network to the wireless device. Further, the apparatus includes means for receiving multimedia test data and wireless device performance data from the wireless device across the wireless network based on execution of the test configuration. Also, the apparatus includes means for analyzing the received multimedia data and wireless device performance data. Additionally, the apparatus includes means for generating a test report based on the analysis.

In further aspects, an apparatus comprises an information repository operable to receive and store multimedia test data and wireless device performance data collected by a wireless device based on execution of a test configuration on the wireless device operable to test a multimedia application programming interface (API) resident on the wireless device. The apparatus also includes an analysis engine operable to analyze the received multimedia test data and wireless device performance data based upon predetermined thresholds. Additionally, the apparatus includes a report generator operable to generate a test report based on the analysis of the received multimedia test data and wireless device performance data.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

Apparatus and methods are herein described for testing APIs on a wireless device. In some non-limiting cases, for example, the test results may be used to optimize multimedia applications by reporting on data throughput versus quality; dropped multimedia frames based on CPU usage; comparing multimedia APIs performance across different carriers, manufacturers, firmware, and models; and comparing collected multimedia data quality across different wireless devices.

Figure 1:
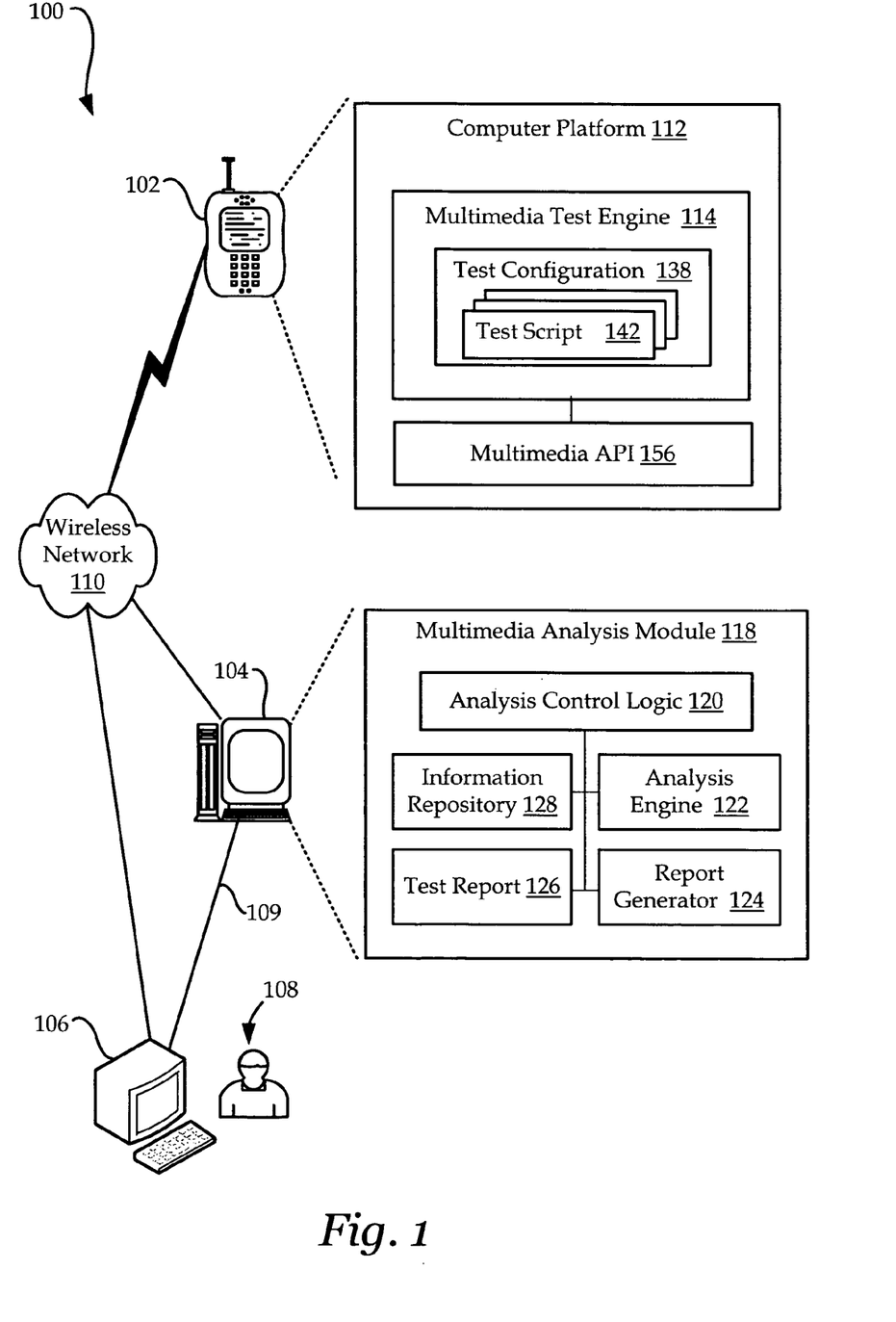
FIG. 1 is a schematic diagram of one aspect of a system for testing multimedia APIs for a wireless device.

FIG. 1 illustrates one aspect of a system 100 operable to test and exercise multimedia APIs 156 embodied in wireless device 102. Generally, system 100 may include the wireless device 102, a multimedia analysis server 104, a test workstation 106, and a wireless network 110 enabling the system components to communicate electronically. Although the embodiments disclosed herein describe apparatus and methods for testing multimedia APIs, in other aspects, the APIs under test are not limited to multimedia applications and multimedia subsystems, and may include any software component resident on wireless device 102.

Methods embodied in wireless device 102 may comprise receiving one or more test scripts 142 and/or test data embodied in a test configuration 138. Operated upon by a memory resident multimedia test engine 114, the test scripts 142 simulate the operation of a multimedia application, initiating calls to multimedia APIs 156 in order to access multimedia subsystems residing on wireless device 102. All incoming and outgoing video and audio data, as well as device performance data, e.g., radio frequency ("RF") environment data and data throughput, may be monitored and recorded on the wireless device 102. Further, the disclosed methods may establish a multimedia connection between the wireless device 102 and a predetermined destination, e.g., multimedia analysis server 104. The recorded data, generated based on the configuration 138, may be forwarded to a multimedia analysis module 118 hosted on the multimedia analysis server 104, where the data may be stored in an information repository 128.

The multimedia analysis module 118, controlled by analysis control logic 120, may further include an analysis engine 122 and a report generator 124. The analysis performed by the analysis engine 122 may include determining the performance of one or more APIs, including comparing the received multimedia files with transmitted data, analyzing throughput and quality, and comparing wireless performance data with stored threshold values. Viewable on the server 104 by an authorized user, e.g. test engineer 108, the analysis may comprise graphs, charts, etc. Furthermore, the report generator 124 is operable to generate a test report 126, which may comprise one or any combination of the API performance analysis, the test data, and the test configuration. Test report 126 may be sent electronically, e.g. via e-mail, to a destination address, for example, to a test engineer 108 operating test workstation 106, or any other predetermined party interested in API performance. It should be note, however, that the analysis engine 122 and report generator 124 may reside on the wireless device 102, depending on the memory and processing capability of the device.

Furthermore, the workstation 106 may provide the test engineer 108 access to the functionality of multimedia analysis server 104 via a wired connection 109 or through wireless network 110. In some aspects of system 100, test workstation 106 may communicate directly with wireless device 102. In other aspects, test workstation 106 may be a slave to remote server 104, wherein the remote server 104 manages connectivity to the wireless devices 102 and is operable to validate the identity of devices requesting information from, or connection to wireless device 102, e.g., test workstation 106. For example, based on test report 126, a new test configuration 138 may be generated and/or activities may be performed to adjust the characteristic of one or more APIs to change their performance with respect to a given test.

Activities performed herein may be performed on any form of wireless device or computer module, including a wired or wireless communication portal, including without limitation, wireless modems, PCMCIA cards, access terminals, personal computers, telephones, or any combination or sub-combination thereof.

Figure 2:
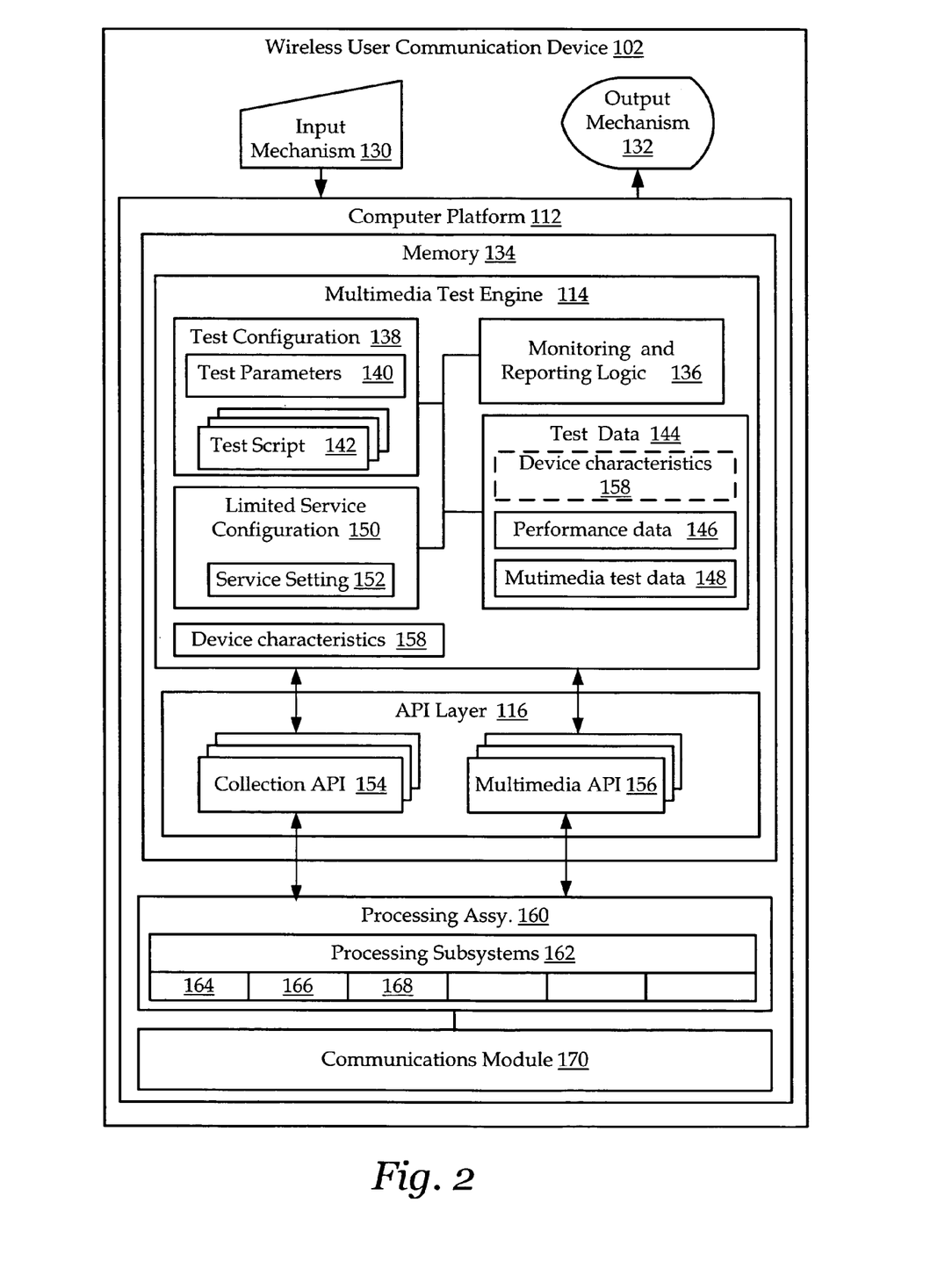
FIG. 2 is one aspect of a block diagram of the wireless device of FIG. 1.

Referring to FIG. 2, wireless device 102 may include computer platform 112 operable to receive and execute software applications and test scripts, e.g. multimedia test engine 114 and test configuration 138, and transmit both recorded video frames and wireless device performance data across wireless network 110 to remote devices.

Wireless device 102 may include any type of computerized, wireless device, such as cellular telephone 102, personal digital assistant, two-way text pager, portable computer, and even a separate computer platform that has a wireless communications portal, and which also may have a wired connection to a network or the Internet. The wireless device can be a remote-slave, or other device that does not have an end-user thereof but simply communicates data across the wireless network 110, such as remote sensors, diagnostic tools, and data relays.

Wireless device 102 may also include input mechanism 130 and output mechanism 132 interconnected to computer platform 112. Input mechanism 130 is operable to generate an input into wireless device 102, and may include a mechanism such as a key or keyboard, a mouse, a touch-screen display, and a voice recognition module. Output mechanism 132, may include a display, an audio speaker, and a haptic feedback mechanism, for example, for relaying information to the user of the wireless device 102.

Computer platform 112 may include a memory 134, which may further comprise volatile and nonvolatile memory such as read-only and/or random-access memory (RAM and ROM), EPROM, EEPROM, flash cards, or any memory common to computer platforms. Further, memory 134 may include one or more flash memory cells, or may be any secondary or tertiary storage device, such as magnetic media, optical media, tape, or soft or hard disk, including removable memory devices and external memory devices. Additionally, memory 134 may be operable to store test data comprising multimedia test data 144, e.g., received image, audio and video data, processed image, audio and video data, as well as wireless device performance data 146, e.g., RF environmental data, throughput and other connection related data. Furthermore, each wireless device 102 may have device characteristics 158 stored in memory 134 that may include device identification (ID), a manufacturer's identification, device hardware and software configurations, and other information pertaining to the specific wireless device 102. Portions of the device specific information 158, and the given test configuration 138, may be included in test data 144 and may be forwarded to remote server 104 along with test data 144.

Further, computer platform 112 may include a processing assembly 160, which may be an application-specific integrated circuit (ASIC), or other chipset, processor, logic circuit, or other data processing device operable to execute application programs resident in memory 134. Processing assembly 160 includes various processing subsystems 162 embodied in hardware, software, firmware, executable instructions, data, and combinations thereof, that enable the functionality of wireless device 102 and the operability of the wireless device on wireless network 110.

More specifically, processing subsystems 162 may allow for initiating and maintaining communications, and exchanging data, with other networked devices and applications executing on computer platform 112, including any subsystem component that receives data reads and data writes from API layer 116 on behalf of multimedia applications. In one aspect, such as in a cellular telephone, processing subsystems 162 may include display system monitor 164, sound system monitor 166, diagnostic system monitor 168, non-volatile memory, file system, transmit, receive, searcher, layer 1, layer 2, layer 3, main control, remote procedure, handset, power management, digital signal processor, video, camcorder, vocoder, messaging, call manager, a BLUETOOTH system, BLUETOOTH LPOS, position determination, position engine, user interface (UI), sleep, limited services, security, authentication, USIM/SIM, voice services, graphics, USB, and multimedia such as MPEG, GPRS, etc.

API layer 116 comprises software components that interface application programs with processing assembly 160 and the subsystems comprised therein. In one aspect, API layer 116 is a runtime environment executing on the respective wireless device. One such runtime environment is Binary Runtime Environment for Windows (BREW) software developed by QUALCOMM, Inc., of San Diego, Calif. Other runtime environments may be utilized that, for example, operate to control the execution of applications on wireless computing devices.

In some aspects, API layer 116 may comprise a collection of fully tested software components, e.g., APIs 154, that enable application software to communicate with processing assembly 160. Furthermore, in the test environment disclosed herein, API layer 116 may comprise untested APIs, including untested multimedia APIs 156, for applications utilizing multimedia subsystems.

In some aspects, memory resident multimedia test engine 114 is operable to test multimedia APIs 156, and the corresponding multimedia portions of the underlying processing subsystem 162. The multimedia test engine 114 may include monitoring and report logic 136 operable to collect multimedia test data 144 relating to the performance of a given multimedia API based on the execution of the test configuration 138. Test data 144 may include, but is not limited to, any information in any processing subsystem 162 relating to the execution of a given test script 142. For example, in a non-limiting case, multimedia test engine 114 receive and collect video and still image data through the display system monitor 164 and its BREW® extension. Similarly, in some aspects, sound data may be collected through the wireless device OEM layer or through sound system monitor 166 and its BREW® extension. Furthermore, in some aspects, wireless device performance data 146, including RF environment data, may be collected through at least one of the wireless device OEM layer, the diagnostic system monitor 168 and its BREW® extension, code division multiple access (CDMA) events, and "Over The Air" (OTA) messages. It should be noted that although the above examples reference BREW® extension and the CDMA protocol, that the described embodiments apply to any type of API layer and any type of communications and/or multimedia protocol. Multimedia files, e.g., image, video and audio files, transferred to and from wireless device 102 may be stored in a multimedia test data portion 148 of test data 144.

Monitoring and reporting logic 136 is further operable to detect a control command 176 (see FIG. 3) transmitted from a remote device, e.g., multimedia analysis server 104 and test workstation 106. Upon receipt of a control command 176, the monitoring and reporting logic 136 is operable to parse the command to determine an appropriate action. For example, a bootstrap command may be received instructing wireless device 102 to download a test configuration 138. Another command may request a transfer of test data 144 to multimedia analysis server 104. In some embodiments, test data 144 may be uploaded upon completion of a test script 142. In other embodiments, monitoring and reporting logic 136 may upload portions of test data 144, e.g., performance data 146, as the data become available at any point during the execution of a test script 142.

The multimedia test engine 114 may be loaded into memory 134 by various mechanisms including, but not limited to, being downloaded from any computer device physically attached to, or in electrical communication with wireless device 102, e.g. multimedia analysis server 104.

Furthermore, multimedia test engine 114 is operable to receive a test configuration 138 that may include a set of test scripts 142 and a set of test parameters 140. In one aspect, test scripts 142 may be written, for example, by test engineer 108, in any software language executable by processing assembly 160, including, but not limited to PHP: Hypertext Preprocessor (PHP), Practical Extraction and Report Language (PERL), Extensible Mark-up Language (XML), a custom language, and any combination thereof. Test scripts 142, under control of monitoring and reporting logic 136, are operable to test and exercise the functionality of multimedia APIs 156 and may be single-threaded or may initiate multiple threads.

Test configuration 138 may include configurable test parameters 140 used by monitoring and reporting logic 136 to monitor the tests being performed, store transmitted and received multimedia data, and forward the results to a determined address. For example, test parameters 140 may instruct monitoring and reporting logic 136 to accumulate performance test data including, but not limited to, RF environment data, including "Searcher and Finger Info" for CDMA systems, "WCDMA Finger Info for TA" for Universal Mobile Telecommunications Service (UMTS) systems, hand-offs, signal strength, and in/out service events, etc. In addition, data specific to the wireless device 102 may be recorded, e.g., firmware, software, hardware, model, manufacturer, and wireless identification (ID). Furthermore, while in some embodiments, test parameters 140 may comprise a separate component within test configuration 138, in other embodiments, the test parameters 140 may be incorporated within the test scripts 142.

Furthermore, test parameters 140 may include configurable reporting parameters that control the destination and the timing of transferring the test results to the multimedia analysis server 104. For example, the test results may be transmitted as the result becomes available, or upon completion of each, or all of, test scripts 142. Furthermore, in other embodiments, monitoring and reporting logic 136 may upload test results to the multimedia analysis server 104 as a response to a command issued by the multimedia analysis server 104. Upon receipt of the test results, the multimedia analysis server 104 may transmit a message back to the wireless device 102 acknowledging receipt.

Computer platform 112 may further include a communications module 170 embodied in hardware, software, executable instructions, data, and combinations thereof, operable to enable communications among the various components of the wireless device 102 and wireless network 110. Communications module 170 may comprise any component/port/interface that may include any point of entry into, and/or any point of exit from wireless device. As such, communications module 170 may include interface components for hardwired communications and for wireless communications.

In one aspect, selected data may be transmitted over an open communication connection between the wireless device 102 and the wireless network 110, "piggybacking" on an ongoing voice or data call across an open connection. Alternatively, in a cellular network configuration, test data 144 may be transmitted to multimedia analysis server 104 through short message service (SMS), file transfer protocol (FTP), and hypertext transfer protocol (HTTP). Furthermore, as previously noted, another aspect of the multimedia analysis server 104 may "pull" test data 144 from the wireless device 102 across the network 110 on a scheduled or ad hoc basis.

In some aspects, data transmission between the wireless device 102 and remote devices, e.g., multimedia analysis server 104 and test workstation 106, may be transmitted over a limited-access communications channel through wireless network 110. The communication channel may be set up based upon a limited service configuration 150 and may be used for transmitting test data 144 to multimedia analysis server 104 or for downloading at least portions of multimedia test engine 114 and test configuration 138, to wireless device 102. The limited-access communications channel is generally not available to the end user and may be configured based on limited service setting 152 that identifies allowable types of communications, and the associated communication channels that may be utilized. Limited service configuration 150 may be downloaded over wireless network 110, may be locally transferred to wireless device 102, such as through a serial connection, or may be preloaded on the wireless device 102.

Figure 3:
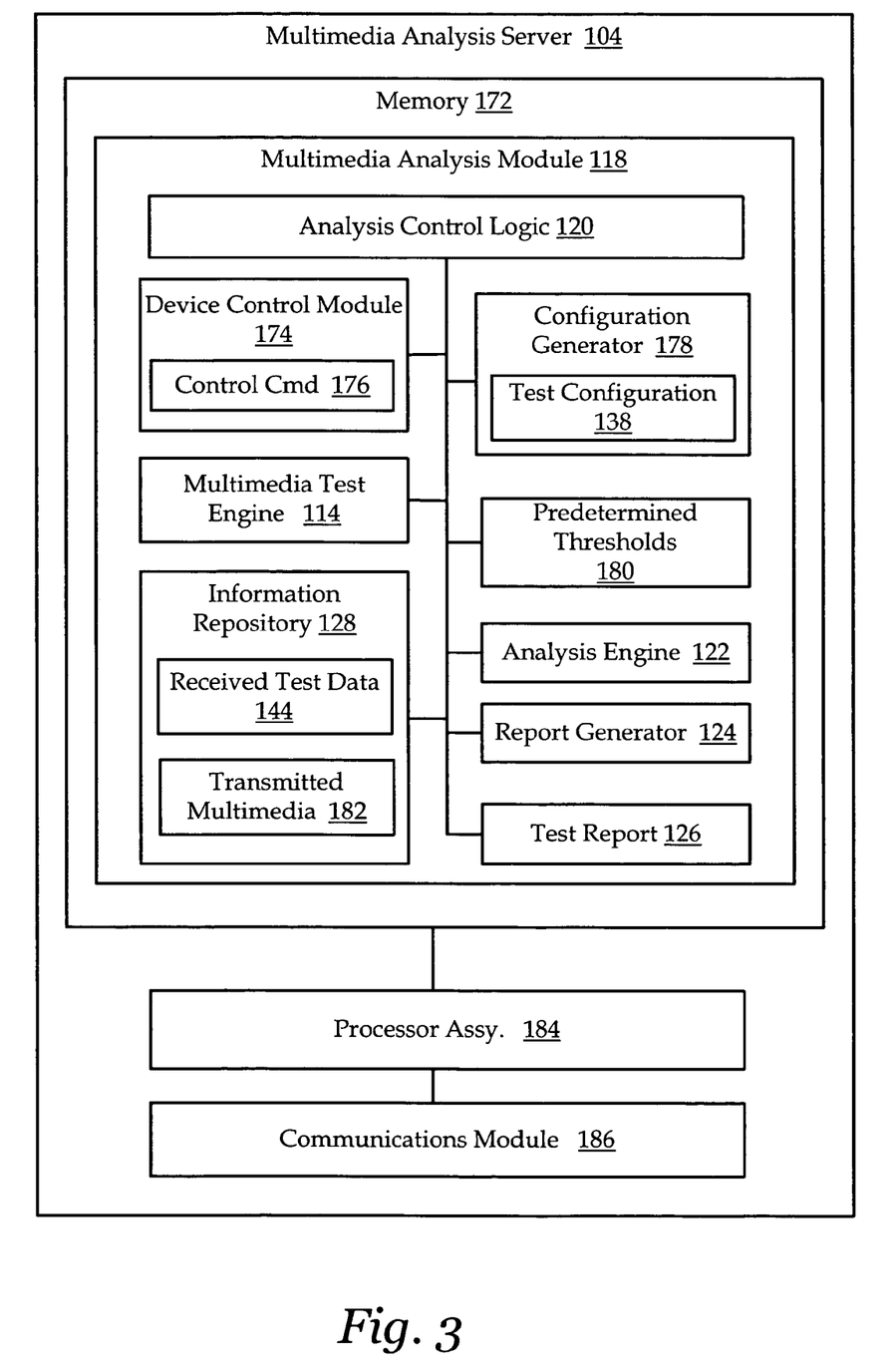
FIG. 3 is one aspect of a block diagram of the multimedia analysis server of FIG. 1.

Referring to FIG. 3, multimedia analysis server 104 (or plurality of servers) may, via communications module 186, send software agents or applications, such as any portion of multimedia test engine 114 including test configuration 138, to wireless device 102 across wireless network 110. Multimedia analysis server 104 may comprise at least one of any type of server, personal computer, mini computer, mainframe computer, or any computing device either special purpose or general computing device, e.g., processor assembly 184. Further, there can be separate servers or computer devices associated with multimedia analysis server 104 that work in concert to provide data in usable formats to parties, and/or to provide a separate layer of control in the data flow between the wireless devices 102 and multimedia analysis server 104.

Multimedia analysis server 104 may further comprise a memory 172 and a memory resident multimedia analysis module 118 including software, hardware, data, and generally any executable instructions operable to manage the collection and reporting of test data 144 from at least one wireless device 102. For example, server 104 may include analysis control logic 120 operable to control the operation of all components of multimedia analysis module 118, Multimedia analysis module 118 may further include information repository 128 for storing test data 144 received from wireless device 102 and may comprise any type of memory or storage device. Furthermore, information repository 128 may store multimedia data 182 transmitted to wireless device 102 to be later compared with data received from the test engine 114.

Furthermore, the multimedia analysis module 118 may comprise a device control module 174 operable, by execution of control logic 120, to either directly execute control command 176 on wireless device 102 or transmit control command 176 to wireless device 102 for local execution.

As previously disclosed, multimedia analysis module 118 is operable to receive wireless device test data 144, store the data in information repository 128, analyze the data, and present the results to a test engineer 108. Analysis may include, but is not limited to, reports and presentations on data throughput vs. quality; dropped frames (video and/or audio) based on processing engine 160 usage; a comparison of multimedia API performance across multiple manufacturers, firmware, and models; and a comparison of multimedia data quality between different wireless devices.

In some embodiments, the analysis may be performed by analysis engine 122, which may include one or any combination of hardware, software, firmware, data, decision-making routines, statistical programs, fuzzy logic, heuristic relationships, neural networks, for analyzing and interpreting received test data 144, e.g., comparing video and sound frames received from the wireless device 102, with video and sound frames transmitted to the wireless device 102. Furthermore, analysis engine 122 may compare performance data 146, stored in information repository 128 as part of test data 144, with predetermined thresholds 180. Such threshold data may include RF environment data, dropped frames, etc.

For example, in a case where a video conferencing-related API is tested, analysis engine 122 may receive test data 144 comprising received image data, which may be compared to resident source image data in order to determine the performance of one or more APIs. For instance, the received image data and source image data may be compared on a pixel-by-pixel basis to determine pixel loss. In another example, analysis engine 122 may correlate received performance data 146, such as RF environmental data, with the above-described pixel-by-pixel analysis in an attempt to identify conditions relating to received image data quality.

In addition to providing the results of analysis engine 122, the multimedia analysis module 118 is operable to present a ready view of multimedia and RF related test information collected from the wireless devices 102 in any form, such as tables, maps, graphics views, plain text, interactive programs or web pages, or any other display or presentation of the data. For example, multimedia and RF related test information may be viewable online by a test engineer 108 having access to remote server 104, via HTTP, HTTPS, an FTP, or some other data transfer protocol.

Furthermore, in addition to being able to present the full analysis, including graphs, to an authorized user, e.g., test engineer 108, the multimedia analysis module 118 may be operable to generate an electronic message, e.g., e-mail and facsimile, to a device, such as test workstation 106, notifying the recipient of the availability of the data. Such a message may further comprise a report 126 created by report generator module 124 based upon the analyzed data.

Figure 4:
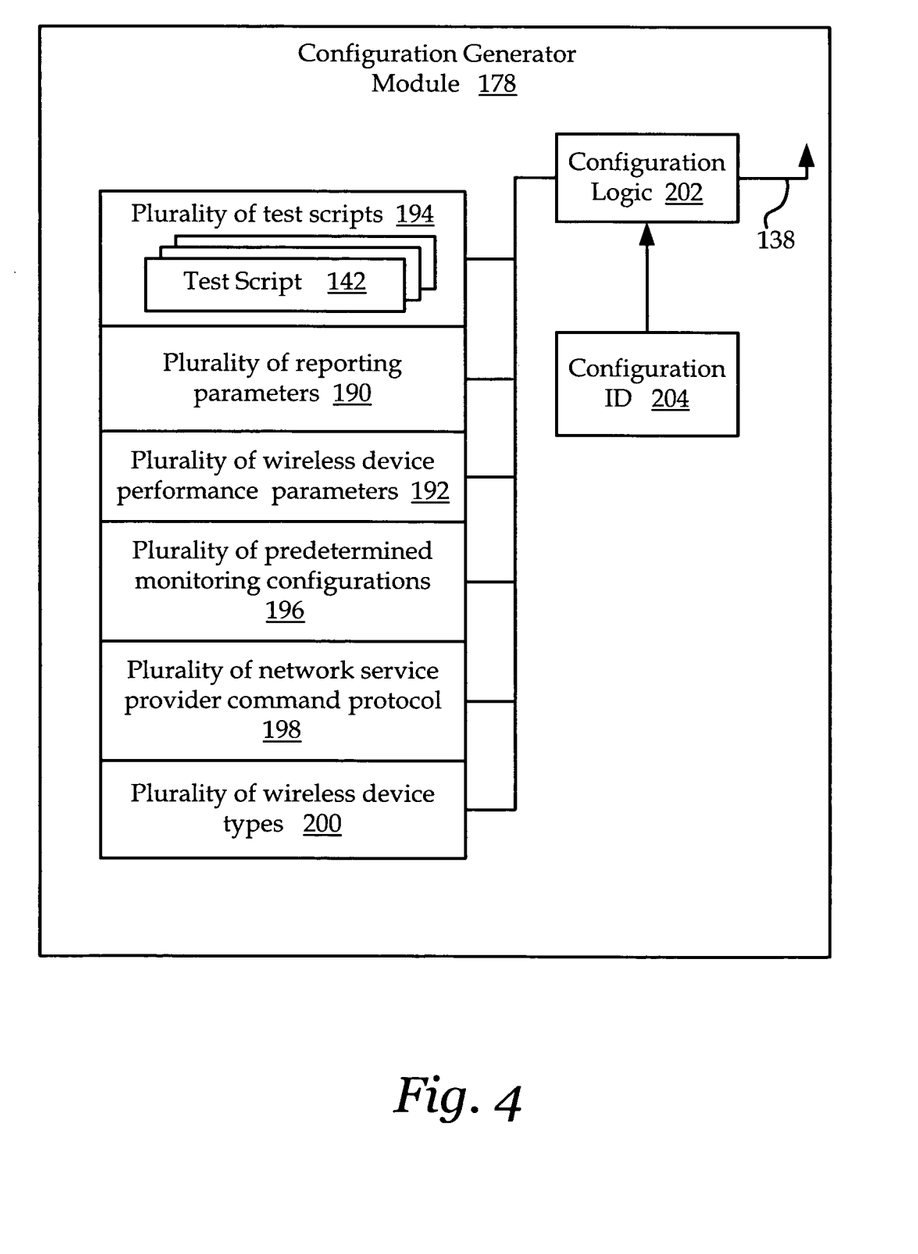
FIG. 4 is a schematic diagram of one aspect of a configuration generator module associated with the multimedia analysis module of FIG. 1.

Multimedia analysis module 118 may further include a configuration generator module 178 operable to generate the test configuration 138 loaded onto wireless device 102. Referring to FIG. 4, one embodiment of a configuration generator module 178 may include hardware, software, firmware, executable instructions, data, and/or any other associated logic that allows the configuration generator module 178 to generate test configuration 138. In some aspects, configuration generator module 178 may be operable to execute configuration logic 202 that assembles the various components of a given configuration 138 based on selections from a plurality of selectable test scripts and other parameters.

For example, test engineer 108 may load multiple sets of test scripts 142 on remote server 104. However, the test engineer 108 may wish to test only a subset of the plurality of test scripts 194. Accordingly, when building test configuration 138, only those test scripts 142 desired would be loaded into the test configuration to be downloaded to wireless device 102.

In some aspects, configuration generator module 178 may configure a plurality of parameters transmitted as part of test configuration 138 and collectively referred to as test parameters 140 in FIG. 2. In some aspects, test parameters 140 may include at least one reporting parameter selected from a plurality of reporting parameters 190. Each of the plurality of reporting parameters 190 may determine when the corresponding collected statistics may be uploaded to remote server 104, including, but not limited to, uploading upon the occurrence of a scheduled event, at a predetermined time, at a predetermined interval, and upon receiving a command by a remote device, such as by remote server 104 and test workstation 106.

In one aspect the wireless device 102 may transfer multimedia test data 144 to the multimedia analysis server 104. In other embodiments, the test engineer 108 may wish the data 144 to be stored on another device. Accordingly, the plurality of reporting parameters may include a destination address of the uploaded test data 144.

Furthermore, exercising and testing APIs 156 may include transferring multimedia files between the wireless device 102 and a device simulating a multimedia provider that may include the multimedia analysis server 104 and the test workstation 106. Accordingly, the plurality of reporting parameters 190 may include an address of a network device with which the multimedia test engine 114 may exercise data transfers with a multimedia data provider. Such a device may include test workstation 106 and the multimedia analysis server 104.

In addition, configuration generator module 178 may include a plurality of wireless device performance parameters 192 from which one or more parameters may be selected. The plurality of wireless device performance parameters 192 enables an authorized user 108 to configure the multimedia test engine 114 to monitor and report any predetermined parameter that may be related to and/or associated with wireless performance and testing, e.g., RF environment parameters and dropped frames, etc.

In addition, rather than selecting the various parameters individually, configuration logic 178 may provide the user with the ability to select from a menu of a plurality of predetermined configurations 196, including predetermined groupings of the above-noted parameters comprising test configuration 138.

Further, in some aspects, the selected one of the plurality of wireless device types/models 200 and the selected one of the plurality of network service providers/communication protocols 198 may be correlated to a given one of a plurality of wireless device performance parameters 192. For example, certain parameters may be unavailable, or may not be relevant, on CDMA enabled systems but may be available on UMTS systems, and vice versa. Accordingly, configuration logic 202 may be able to determine which call monitoring capabilities the wireless device 102 should have installed based on the associated device type, network carrier and/or communication protocol, and thus may generate test configuration 138 that includes the appropriate set of corresponding parameters.

Furthermore, different network providers may utilize different mobile technologies, e.g. CDMA and UMTS. Accordingly, parameters that make up configuration 138 may vary depending on the type/make/model of the wireless device and/or the network service provider/communications protocol. As such, configuration logic 202 may provide a user with the ability to select from a menu of a plurality of wireless device types/models 200 and a plurality of network service providers/protocols 198 in order to generate an appropriate menu from which to select the parameters of configuration 138.

Once the specific parameters of a given configuration 138 are determined, configuration logic 202 may assign unique configuration ID 204 to the given configuration, storing this configuration in a library for later recall, such as among plurality of predetermined monitoring test configurations 196. Further, configuration logic 202, and/or another component of multimedia analysis module 118, e.g., communications module 186 (FIG. 3) may be operable to transmit configuration 138 to one or more wireless devices 102 to initiate the exercising and testing of multimedia APIs on that device.

The actual location of the disclosed components of the multimedia analysis module 118 is non-limiting and may be physically located on a server or other device connected to wireless network 110.

Figure 5:
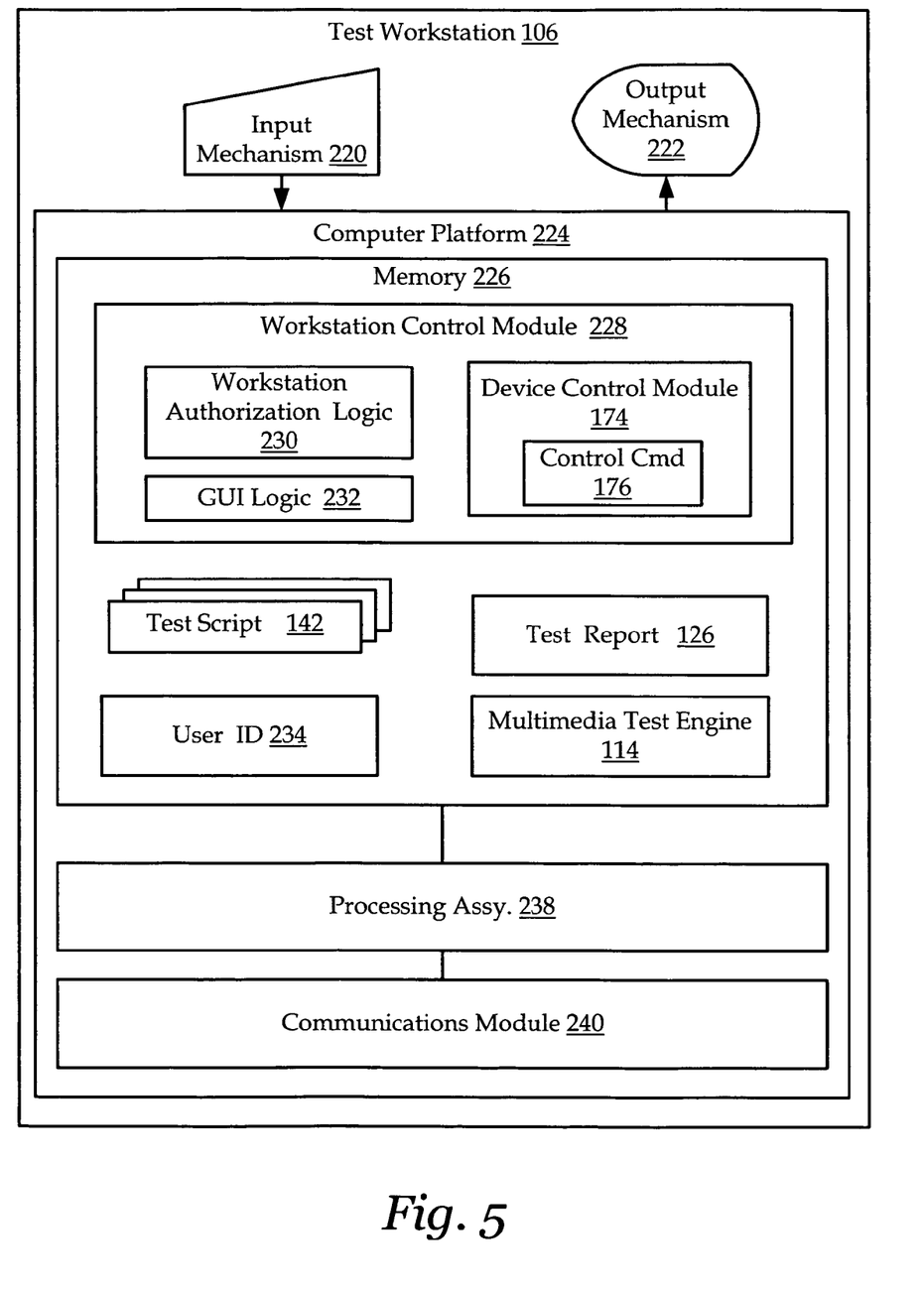
FIG. 5 is one aspect of a block diagram of the test workstation of FIG. 1.

Referring to FIG. 5, test workstation 106 generally provides an interface to multimedia analysis server 104 to access the functionality described herein. In other aspects, one or more of the functionality of the system may be resident in the test workstation 106. In some aspects, test workstation 106 may be operable to store a set of test scripts 142 generated by test engineer 108, and download these scripts directly to wireless device 102 and/or indirectly via multimedia analysis server 104. Furthermore, test workstation 106 is operable to receive reports 126 transmitted by multimedia analysis server 104 or may view the results of analyzer 122 on multimedia analysis server multimedia analysis server 104. In addition, because wireless device wireless device 102 may not have multimedia test engine 114 resident in memory, test workstation test workstation 106 is operable to download multimedia test engine 114 to wireless device 102 either directly or indirectly via multimedia analysis server multimedia analysis server 104.

Test workstation test workstation 106 may comprise at least one of any type of server, personal computer, mini computer, mainframe computer, terminal, or any computing device either special purpose or general computing device operable to communicate with both wireless device 102 and remote server 104. In one aspect, test workstation 106 may comprise a processing assembly 238, and a communications module 240 operable to transmit and receive messages and data between the test workstation 106, the remote server 104, wireless device 102, as well as any network component on wireless network 110. In other aspects, test workstation 106, may reside on any network device of wireless network 110, such as on multimedia analysis server 104, another server connected to the network, or even on a wireless device 102.

Test workstation 106 may further comprise an input mechanism 220, and an output mechanism 222 interconnected to computer platform 224. The input mechanism 220 and the output mechanism 222 may permit a test engineer 108 to interface with the test workstation 106, the multimedia analysis server 104, and ultimately with the wireless device 102.

The workstation computer platform 224 may further comprise a memory 226 for storing applications, e.g., workstation control module 228 and data files, e.g., test scripts 142. Because the number of test workstations 106 and the number of test engineers 108 are non-limiting, user ID 234 may be entered into memory 226 by a test engineer 108, and may be operable to identify the user of a particular test workstation 106 to network components including remote server 104 and wireless device 102.

The workstation control module 228 may further include authorization logic 230 operable in conjunction with Graphic User Interface (GUI) logic 232, input mechanism 220, and output mechanism 222, to guide the test engineer 108 through any analysis and command activity selection and transmission. The GUI logic 232 may control, for example, e-mail communication, report presentation, as well providing a menu by which a device control module 174 similar in structure and function to the device control module of the multimedia analysis module 118. Furthermore, a copy of multimedia test engine 114, stored on the test workstation 106, may permit a test operator 108 to transmit at least a portion of the multimedia test engine 114 to the wireless device 102 and the multimedia analysis server 104.

Referring back to FIG. 1, wireless network 110 includes any communications network operable, at least in part, for enabling wireless communications between wireless device 102 and any device connected to wireless network 110. Further, wireless network 110 may include all network components, and all connected devices that form the network. For example, wireless network 110 may include at least one, or any combination, of: a cellular telephone network; a multicast network such as a Forward Link Only (FLO) network, such as the MEDIAFLO™ System available from Qualcomm, Inc. of San Diego, Calif.; a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association (IrDA)-based network; a short-range wireless network; a BLUETOOTH technology network; a ZIGBEE protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance ("Wi-Fi Alliance") network, and a 802.11 network; a public switched telephone network; a public heterogeneous communications network, such as the Internet; a private communications network; and a land mobile radio network.

Suitable examples of telephone networks include at least one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 6:
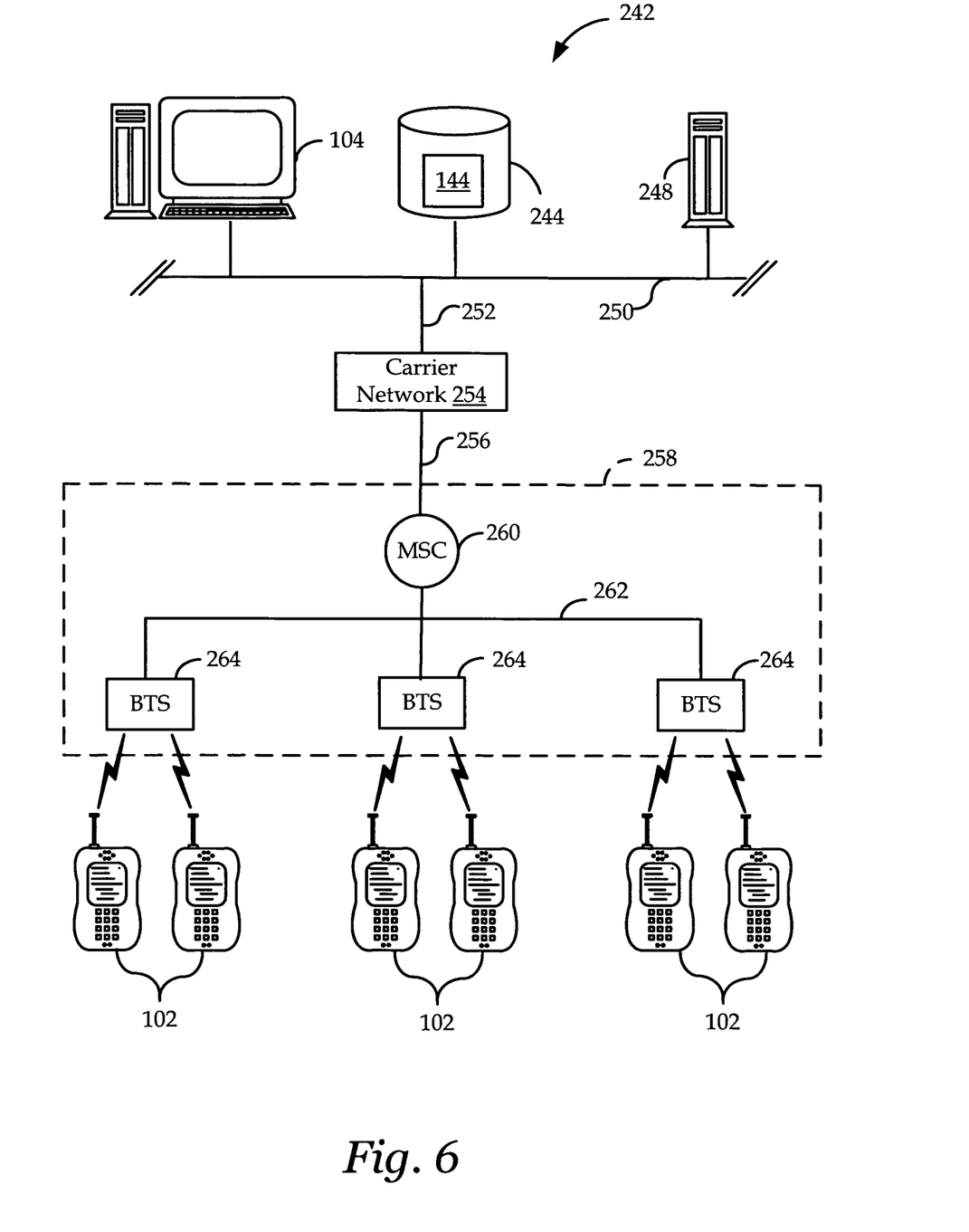
FIG. 6 is a schematic diagram of one aspect of a cellular telephone network aspect of FIG. 1.

Referring to FIG. 6, an aspect of a cellular wireless system 242 comprises at least one wireless device 102 and a cellular telephone wireless network 258 connected to a wired network 250 via a carrier network 254. Cellular telephone system 258 is merely exemplary and may include any system whereby remote modules, such as wireless devices 102 communicate packets including voice and data over-the-air between and among each other and/or between and among components of wireless network 258, including, without limitation, wireless network carriers and/or servers.

According to system 242, multimedia analysis server 104 may communicate over a wired network 250 (e.g. a local area network, LAN) with data repository 244 for storing multimedia testing results 144, gathered from wireless devices 102. Further, a data management server 248 may be in communication with multimedia analysis server 104 to provide post-processing capabilities, data flow control, etc. Multimedia analysis server 104, data repository 244 and data management server 248 may be present on the cellular telephone system 242 along with any other network components needed to provide cellular telecommunication services.

Multimedia analysis server 104, and/or data management server 248 may communicate with carrier network 254 through data links 252 and 250, such as the Internet, a secure LAN, WAN, or other network. Carrier network 254 controls messages (generally being data packets) sent to a mobile switching center (MSC) 260. Further, carrier network 254 communicates with MSC 260 by a network 256, such as the Internet, and/or POTS ("plain old telephone service"). Typically, in network 258, a network or Internet portion transfers data, and the POTS portion transfers voice information. MSC 260 may be connected to multiple base stations (BTS) 264 by another network 262, such as a data network and/or Internet portion for data transfer and a POTS portion for voice information. BTS 264 ultimately broadcasts messages wirelessly to the wireless devices 102, by short messaging service ("SMS"), or other over-the-air methods.

Figure 7:
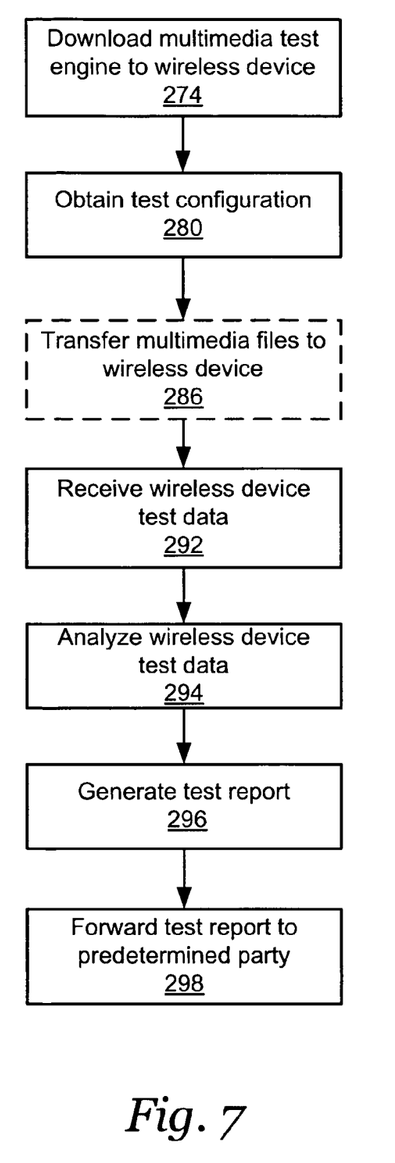
FIG. 7 is a flow chart associated with one aspect of the operation of the system of with respect to the multimedia analysis server of FIG. 1.
Figure 8:
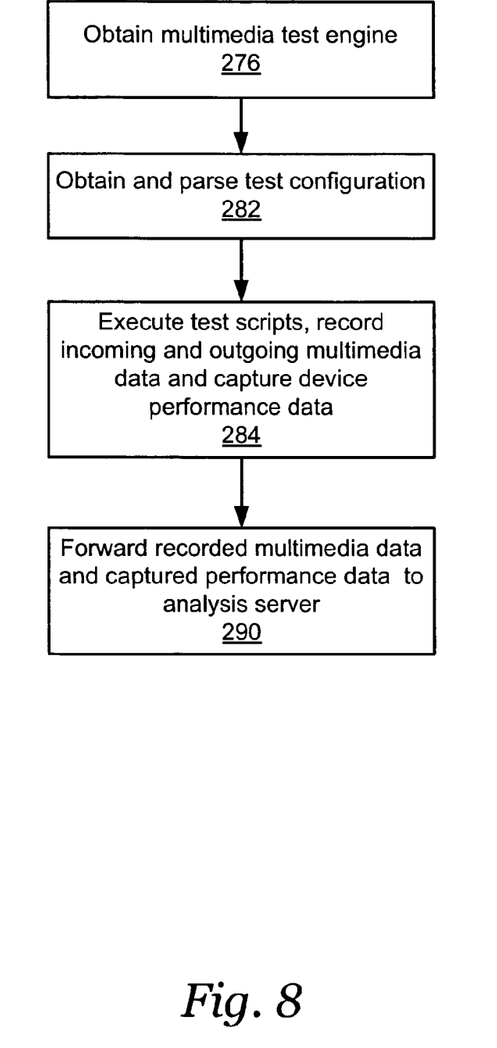
FIG. 8 is a flow chart associated with one aspect of the operation of the system of with respect to the wireless device of FIG. 1.

Referring to FIGS. 7 and 8, in some aspects, a method for automatically exercising and testing multimedia APIs on a wireless device may include downloading, at steps 274 and 276, multimedia test engine 114 from the multimedia analysis server 104 to wireless device 102. In other aspects, multimedia test engine 114 may be loaded into memory 186 by other mechanisms including, but not limited to, being downloaded from any computer device connected to wireless network 110, and being loaded from a computer device hardwired to wireless device 102.

At step 280, the method may include the multimedia analysis server 104 obtaining a test configuration operable to test a performance of one or more APIs. An authorized user, such as test engineer 108, operating test workstation 106 and/or multimedia analysis server 104 may create one or more test scripts 142 which may be included in the test configuration 138. In some aspects, test configuration 138 may be downloaded directly from workstation 106 to wireless device 102.

At step 282, the method may include the wireless device 102 obtaining and parsing the test configuration 138. For example, the multimedia analysis server 104 may send a bootstrap command 176 to the multimedia test engine 114 on the wireless device 102 via short message service (SMS), automatic call back, or other over-the-air methods. Upon receipt of the bootstrap command 176, the multimedia test engine 114 may parse the command 176, and establish a connection, such as an HTTP connection, with remote server 104 over wireless network 110.

Still referring to step 282, the multimedia test engine 114 may initiate a download of test configuration 138, including one or more test scripts 142, from multimedia analysis server 104. Upon completion of the download process, the multimedia test engine 114 may transmit an acknowledgment message to the multimedia analysis server 104.

At step 284, multimedia test engine 114 on the wireless device 102 may execute the test scripts 142. As previously disclosed, test scripts 142 may be written in any software language executable by processing engine 198, including, but not limited to PHP, PERL, XML, a custom language, and any combination thereof. Test scripts 142 are operable to exercise and test multimedia APIs 156. Multimedia data and/or files generated and transferred as a result of test scripts 142 may be captured by reporting logic 136 as test data 144.

In some aspects, multimedia APIs 156 operate locally and require no connection over wireless network 110. Accordingly, RF environmental data may not be relevant in such instances. However, in other aspects, the testing of APIs 156 may require a wireless connection to a device simulating a multimedia service provider.

For example, in the process of executing the test script at step 284, wireless device 102, under control of multimedia test engine 114, may establish, via communications module 170, an internet connection or some other communications connection with multimedia analysis server 104. Based upon a HTTP, HTTPS, an FTP, or other data transfer protocol, at step 286 multimedia analysis server 104 may transfer multimedia data and/or files to wireless device 102. Based upon test configuration 138, the monitoring and reporting logic 116 may be operable to record the corresponding received multimedia data. Further, the monitoring and reporting logic 116 may be operable to record the API-related performance with respect to the processing of the received multimedia data and/or test scripts.

When testing with a multimedia service provider, e.g., multimedia analysis server 104, RF environmental data may be collected by the wireless device 102, permitting test engineer 108 to correlate multimedia performance with RF quality. RF environment data may be collected on the wireless device through one or more processing subsystems 162. For example, such data may reside in at least one of the OEM layer, the diagnostic system monitor and its BREW extension, CDMA events, and "Over The Air" (OTA) messages. Multimedia test engine 114 is operable to store the RF environment data as performance data 146. The collected performance data is configurable based upon test script 142 and/or test parameters 140, and may include, but is not limited to "Searcher and Finger Info" for CDMA systems, "WCDMA Finger Info for TA" for UMTS systems, hand-offs, signal strength, and in/out service events.

Further, at step 292, the method may include the multimedia analysis server 104 receiving the test data 144 based on the execution of the test configuration 138 from the wireless device 102. For example, upon completion of execution of test scripts 142, wireless device 102, under control of multimedia test engine 114, may initiate a transfer of test data 144 to information repository 128 using any communication means or connection to server 104 to which the wireless device 102 has access.

Test data 144 received by the multimedia analysis server 104 at step 292 may include captured multimedia data, performance data including RF environmental data, and other test script results. Although multimedia test engine 114 is operable to transmit test data 144 upon completion of test scripts 142, test engine 114 may, based upon test configuration 138, upload test results as the data becomes available.

At the completion of the upload, the multimedia analysis server 104 may be operable to transmit an acknowledgment message to the wireless device 102 indicating successful upload of the test data 144.

At step 294, multimedia analysis module 118 may process and analyze the collected data. In some aspects, analysis engine 122 is operable to process data stored in information repository 128 and provide an analysis including visual displays of charts and graphs. Such analysis may include analyzing API performance with respect to executing the given test configuration, including analyzing, for example, data throughput vs. quality, dropped frames (video and/or audio), and processor usage. Further, the analysis may include a comparison of multimedia API performance across multiple manufacturers, firmware, and models, and a comparison of multimedia data quality between different wireless devices. Furthermore, when testing includes transmitting and/or receiving multimedia to/from a multimedia service provider, i.e., the multimedia analysis server 104, the analysis engine 122 and the report generator 124 are operable to produce analyses and reports that correlate multimedia data with RF environment data. As will be discussed below, complete results of the analysis may be viewed online by an authorized user, such as a user operating test workstation 106.

At step 296, report generator 124 is operable to produce a test report 126 that includes at least a subset of the full analysis performed at step 294. In some embodiments the test report 126 is generated by report generator 124 operating on the results of the analysis of step 294. In other embodiments, the report generator 124 may generate report 126 based upon the data in information repository 128.

At step 298, the multimedia analysis server 104 is operable to notify a predetermined party, such as the test engineer 108, that the analysis is complete and that the full analysis, including graphs, is available. For example, the multimedia analysis module 118 may be operable to generate an electronic message, e.g., an e-mail, to a predetermined party, such as the test workstation 106 that includes report 126. The recipient, e.g., the test engineer 108, may view the test report 126 and analyze the test results on the multimedia APIs 156.

Thus, the described aspects allow a systematic and automatic method of exercising and testing multimedia APIs and may reduce the time required for regression testing by a chipset provider/OEM.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or aspects, it should be noted that various changes and modifications could be made herein without departing from the scope of the described aspects and/or aspects as defined by the appended claims. Furthermore, although elements of the described aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of testing multimedia application programming interfaces (APIs) on a wireless device on a wireless network, comprising:

obtaining on the wireless device a multimedia test configuration including at least one test script, wherein obtaining on the wireless device a test configuration comprises receiving a test configuration from a remote device over the wireless network;

executing the at least one test script with a processor of the wireless device, the at least one test script exercising a predetermined multimedia application program interface (API) embodied on the wireless device;

establishing a connection with a predetermined device across the wireless network and receiving multimedia data for execution on the wireless device from the predetermined device during execution of the at least one test script;

recording on the wireless device multimedia test data relating to performance of the multimedia API based on execution of the test script;

capturing wireless device performance data corresponding to the multimedia test data; and forwarding the recorded multimedia test data and the wireless device performance data to the predetermined device across the wireless network for analysis of the performance of the multimedia API.

2. The method of claim 1, wherein capturing wireless device performance data comprises capturing wireless device performance statistics based upon parameters included within the test configuration.

3. The method of claim 1, wherein capturing wireless device performance data further comprises capturing at least one of over-the-air messages and wireless device call events.

4. The method of claim 1, wherein the predetermined device is determined by a multimedia provider address parameter in the test configuration.

5. The method of claim 1, further comprising capturing radio frequency ("RF") environment data corresponding to the connection with the predetermined device.

6. The method of claim 4, further comprising capturing throughput information with respect to the received multimedia data.

7. The method of claim 1, wherein the test configuration is selected from a plurality of test configurations based on at least one of a type of the wireless device, an identity of a network service provider associated with the wireless device, and a type of communication protocol associated with the wireless device.

8. The method of claim 1, wherein obtaining on a wireless device a test configuration comprises establishing a limited-access communications channel across a wireless network based on a predetermined limited service configuration.

9. The method of claim 1, wherein forwarding the recorded multimedia test data further comprises forwarding based on a reporting parameter in the test configuration.

10. The method of claim 1, wherein forwarding the recorded multimedia test data further comprises forwarding based upon at least one of a predetermined schedule, a predetermined event, and a request by a remote device.

11. The method of claim 10, wherein the predetermined event includes completion of the at least one executed test script.

12. A non-transitory machine-readable medium comprising instructions which, when executed by a processor of a wireless device on a wireless network, cause the wireless device to perform operations comprising:

obtaining on the wireless device a multimedia test configuration including at least one test script, wherein obtaining on the wireless device a test configuration comprises receiving a test configuration from a remote device over the wireless network;

executing the at least one test script with the processor of the wireless device, the at least one test script exercising a predetermined multimedia application program interface (API) embodied on the wireless device;

establishing a connection with a predetermined device across the wireless network and receiving multimedia data for execution on the wireless device from the predetermined device during execution of the at least one test script;

recording on the wireless device multimedia test data relating to performance of the multimedia API based on execution of the test script;

capturing wireless device performance data corresponding to the multimedia test data; and forwarding the recorded multimedia test data and the wireless device performance data to the predetermined device across the wireless network for analysis of the performance of the multimedia API.

13. At least one processor of a wireless device on a wireless network, said at least one processor configured with processor-executable instructions to perform operations comprising:

obtaining on the wireless device a multimedia test configuration including at least one test script, wherein obtaining on the wireless device a test configuration comprises receiving a test configuration from a remote device over the wireless network;

executing the at least one test script with the at least one processor of the wireless device, the at least one test script exercising a predetermined multimedia application program interface (API) embodied on the wireless device;

establishing a connection with a predetermined device across the wireless network and receiving multimedia data for execution on the wireless device from the predetermined device during execution of the at least one test script;

recording on the wireless device multimedia test data relating to performance of the multimedia API based on execution of the test script;

capturing wireless device performance data corresponding to the multimedia test data; and forwarding the recorded multimedia test data and the wireless device performance data to the predetermined device across the wireless network for analysis of the performance of the multimedia API.

14. A wireless device, comprising:

means for obtaining on the wireless device a multimedia test configuration including at least one test script, wherein means for obtaining on the wireless device a test configuration comprises means for receiving a test configuration from a remote device over a wireless network;

means for executing the at least one test script on the wireless device, the at least one test script exercising a predetermined multimedia application program interface (API) embodied on the wireless device;

means for establishing a connection with a predetermined device across the wireless network and receiving multimedia data for execution on the wireless device from the predetermined device during execution of the at least one test script;

means for recording on the wireless device multimedia test data relating to performance of the multimedia API based on execution of the test script;

means for capturing wireless device performance data corresponding to the multimedia test data; and means for forwarding the recorded multimedia test data and the wireless device performance data to the predetermined device across the wireless network for analysis of the performance of the multimedia API.

15. A method of determining a performance of a multimedia application programming interface (API) on a wireless device on a wireless network, comprising:

generating a test configuration comprising a test script operable to test the performance of a predetermined multimedia API;

forwarding the test configuration across the wireless network to the wireless device;

transmitting multimedia data over the wireless network to the wireless device during execution of the test configuration by a processor of the wireless device;

receiving multimedia test data and wireless device performance data from the wireless device across the wireless network based on execution of the test configuration;

analyzing the received multimedia data and wireless device performance data; and generating a test report based on the analysis.

16. The method of claim 15, wherein analyzing further comprises comparing the transmitted multimedia data with the received multimedia test data.

17. The method of claim 15, wherein analyzing received wireless device performance data includes analyzing radio frequency environment data.

18. The method of claim 15, wherein analyzing further comprises comparing received multimedia test data and wireless device performance data with predetermined threshold data.

19. The method of claim 15, further comprising transmitting at least a portion of the test report to another computer device.

20. The method of claim 15, further comprising presenting at least a portion of the test report for viewing.

21. The method of claim 15, further comprising selecting the test configuration from a plurality of test configurations based on at least one of a type of the wireless device, an identity of a network service provider associated with the wireless device, and a communication protocol associated with the wireless device.

22. At least one processor configured with processor-executable instructions to perform operations comprising:

generating a test configuration comprising a test script operable to test the performance of a predetermined multimedia application programming interface (API) of a wireless device;

forwarding the test configuration across a wireless network to the wireless device;

transmitting multimedia data over the wireless network to the wireless device during execution of the test configuration by a processor of the wireless device;

receiving multimedia test data and wireless device performance data from the wireless device across the wireless network based on execution of the test configuration;

analyzing the received multimedia data and wireless device performance data; and generating a test report based on the analysis.

23. A non-transitory machine-readable medium comprising instructions which, when executed by a machine, cause the machine to perform operations comprising:

generating a test configuration comprising a test script operable to test the performance of a predetermined multimedia application programming interface (API) of a wireless device;

forwarding the test configuration across a wireless network to the wireless device;

transmitting multimedia data over the wireless network to the wireless device during execution of the test configuration by a processor of the wireless device;

receiving multimedia test data and wireless device performance data from the wireless device across the wireless network based on execution of the test configuration;

analyzing the received multimedia data and wireless device performance data; and generating a test report based on the analysis.

24. A multimedia analysis server, comprising:

means for generating a test configuration comprising a test script operable to test the performance of a predetermined multimedia application programming interface (API) of a wireless device;

means for forwarding the test configuration across a wireless network to the wireless device;

means for transmitting multimedia data over the wireless network to the wireless device during execution of the test configuration by a processor of the wireless device;

means for receiving multimedia test data and wireless device performance data from the wireless device across the wireless network based on execution of the test configuration;

means for analyzing the received multimedia data and wireless device performance data; and means for generating a test report based on the analysis.

* * * * *